H. KOCOUREK.
BELT TRANSMISSION.
APPLICATION FILED MAY 5, 1919.

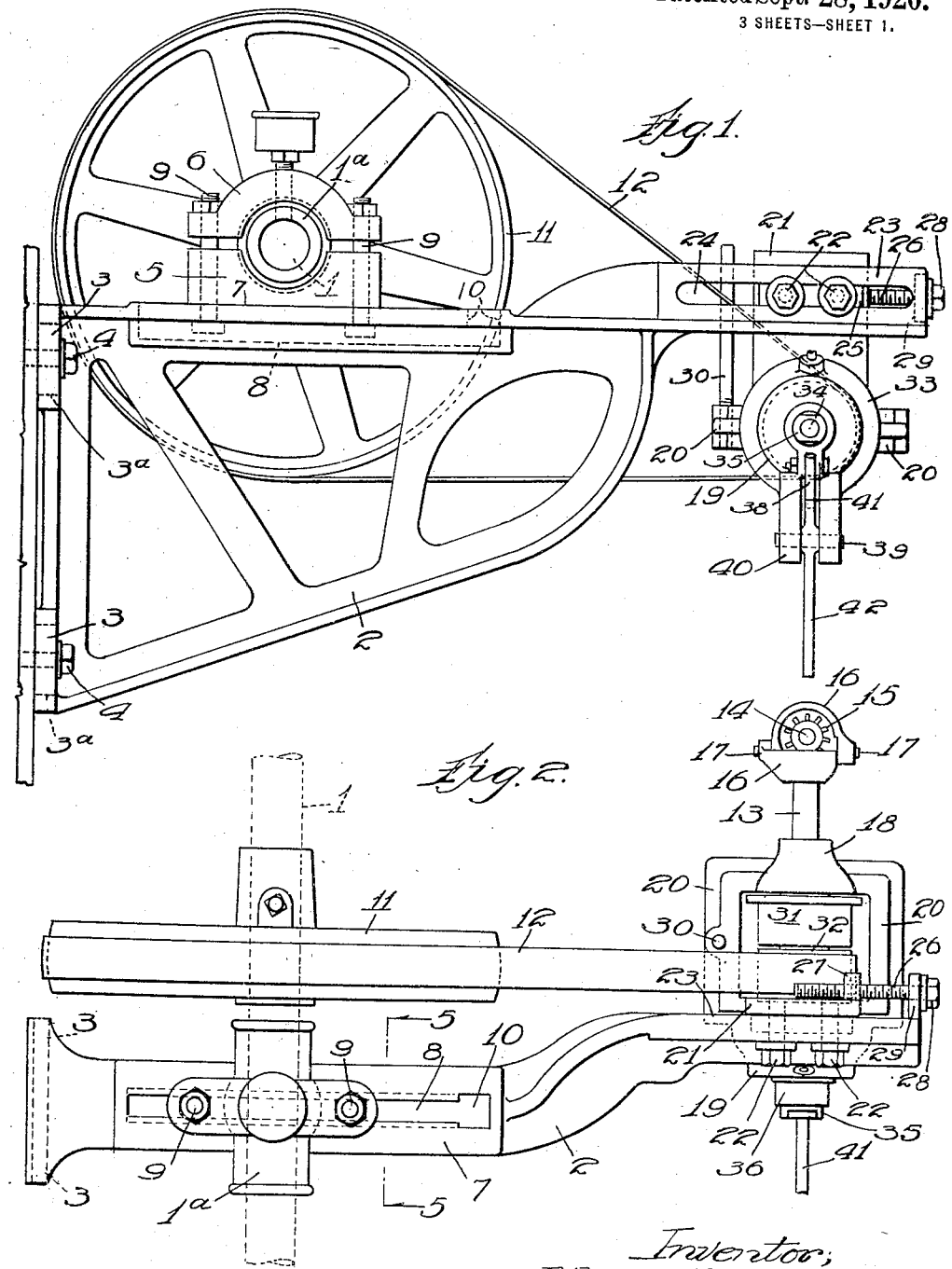

1,354,407.

Patented Sept. 28, 1920.
3 SHEETS—SHEET 2.

Witness.

Inventor,
Henry Kocourek,
by Burlin & Burlin
his Attys.

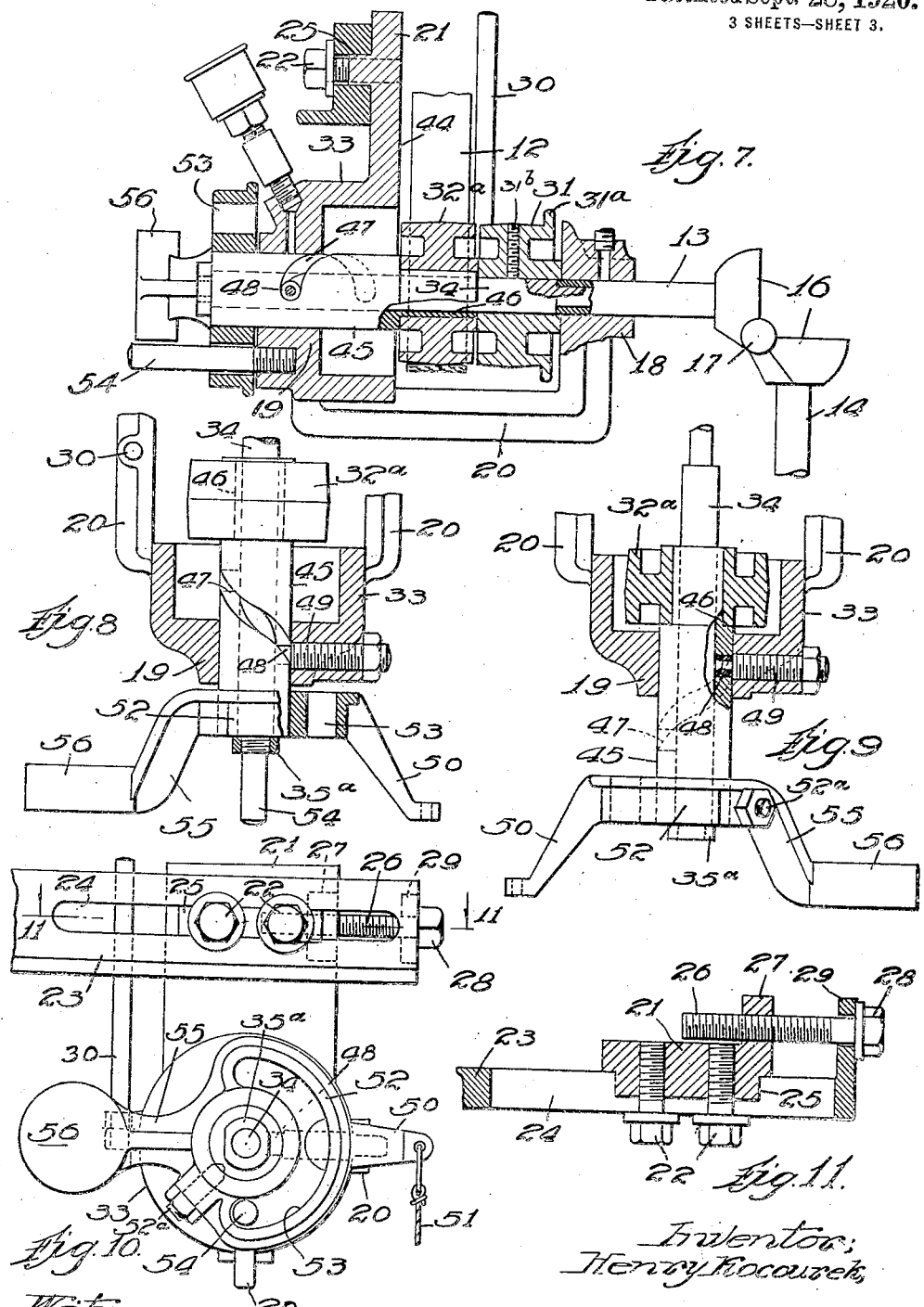

UNITED STATES PATENT OFFICE.

HENRY KOCOUREK, OF CHICAGO, ILLINOIS, ASSIGNOR TO CHICAGO FLEXIBLE SHAFT COMPANY, OF CHICAGO, ILLINOIS, A CORPORATION OF ILLINOIS.

BELT TRANSMISSION.

1,354,407.     Specification of Letters Patent.     Patented Sept. 28, 1920.

Application filed May 5, 1919. Serial No. 294,828.

*To all whom it may concern:*

Be it known that I, HENRY KOCOUREK, a citizen of the United States, residing at Chicago, in the county of Cook and the State of Illinois, have invented certain new and useful Improvements in Belt Transmissions, of which the following is a specification, reference being had to the accompanying drawings, forming a part thereof.

This invention relates to a belt transmission, especially designed for light power purposes and is concerned particularly with means for mounting and adjusting the pulley bearings, and also with means for shifting the driving belt from one to the other of a pair of driven pulleys without changing its path on the driving wheel. These and other details of construction constituting the invention are hereinafter described as shown in the drawings being more particularly indicated by the appended claims.

In the drawings:

Figure 1 is a side elevation of a belt transmission embodying this invention.

Fig. 2 is a top plan view of the same.

Fig. 7 is a sectional view generally similar to Fig. 4, but showing a modified form of shifting means.

Figs. 8 and 9 are horizontal detail sections taken axially with respect to the driven shaft, showing parts of the modified shifter illustrated in Fig. 7, respectively at the two limits of the shifting movement.

Fig. 10 is an elevation looking at the end of the driven shaft with the shifter operating arm and counterweight thereon.

Fig. 11 is a horizontal detail section taken as indicated at line 11—11 on Fig. 10.

Figure 3:
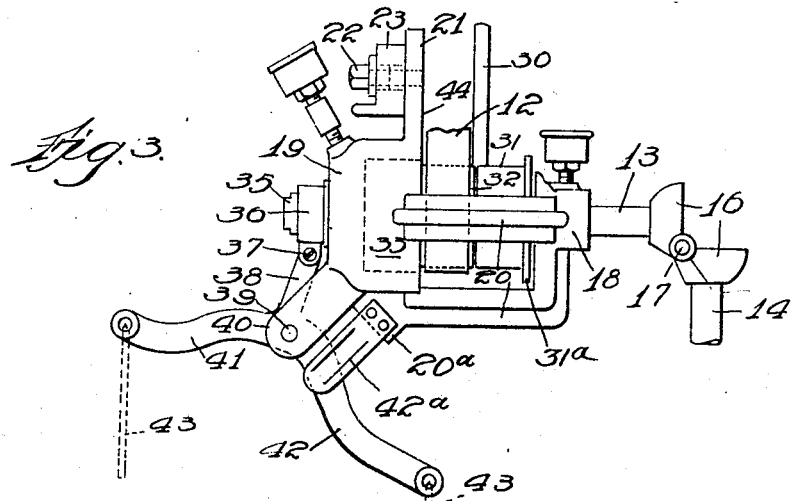
Fig. 3 is an end elevation of the outfit showing the tight and loose driven pulleys and a shifter for them, the belt being shown on the loose pulley.

The outfit shown in the drawings may be understood as associated with a power shaft or so-called "line shaft," indicated at 1, adapted to furnish power for any number of machines desired, or for portable hand tools, the present device delivering the power through a jointed shaft. A bracket arm, 2, is formed with lugs or flanges, 3, having slots, 3ª, through which securing screws 4 extend into any suitable frame member such as the vertical post indicated in the drawings, or a horizontal member if more convenient. A bearing sleeve, 1ª, for the line shaft, 1, is formed with a spherical portion seated in a block, 5, and retained by a cap, 6, these parts being slidably adjustable upon the face, 7, of the bracket, and being retained in adjusted position for proper alinement of the shaft, 1, by means of clamping bolts, 9, extending through the slot, 8, in the part, 7, having been entered therein through an enlargement, 10, of said slot. A driving wheel, 11, secured to the shaft, 1, transmits power through a belt, 12, to a driven shaft carried in the sleeves, 13, and 13ª, and to an extension shaft in sleeve, 14, said shafts being operatively connected by crown gears, 15, in housings, 16, which are hinged together by pins, 17, as shown in Fig. 2, and constituting a well-understood form of universal joint for shafting. The bearing sleeves, 13 and 13ª, of the driven shaft are carried in supports, 18 and 19, connected in a single frame casting by arms, 20, and adjacent the part, 19, a flat vertical arm, 21, extends for clamping by means of screws, 22, to the extending arm, 23, of the bracket, 2, having a slot, 24, in which the screws, 22, are slidably adjustable toward and from the line shaft, 1, for securing proper tension of the belt, 12. The member, 21, is formed with a rib portion, 25, engaging the slot, 24, to relieve the screws, 22, of any twisting strain on the member, and an adjusting screw, 26, engaging a lug, 27, on said member, 21, with its head, 28, bearing upon a corresponding lug, 29, extending from the arm, 23, serves for drawing the member, 21, away from the shaft, 1, against the tension of the belt, in making the final adjustment. This detail is indicated in Fig. 11.

Figure 4:
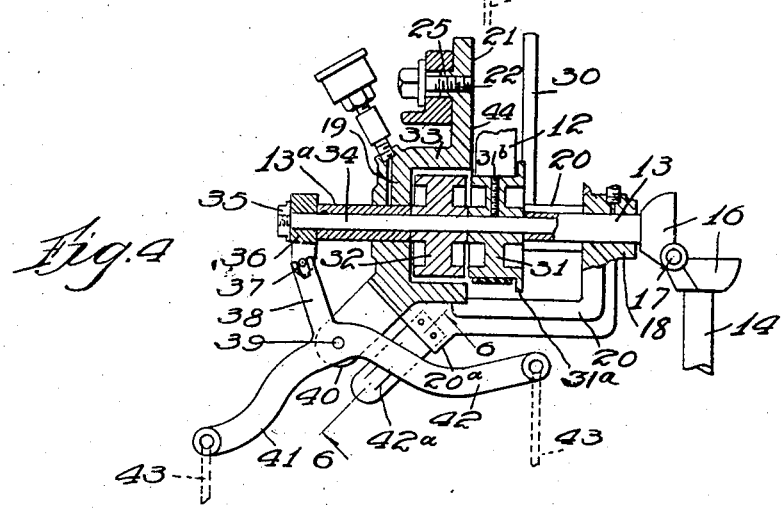
Fig. 4 is a view similar to Fig. 3, but partly in section to indicate details of construction, also showing the two pulleys shifted to bring the belt on to the tight pulley.
Figure 5:
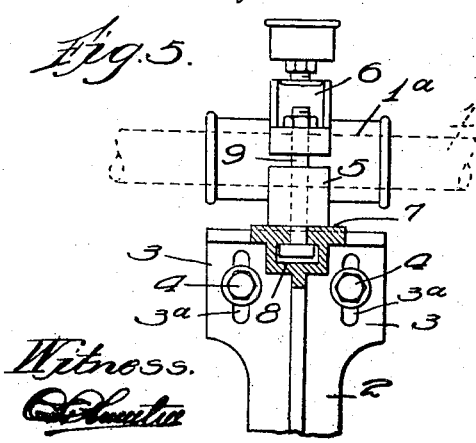
Fig. 5 is a detail section taken as indicated at line 5—5 on Fig. 2.
Figure 6:
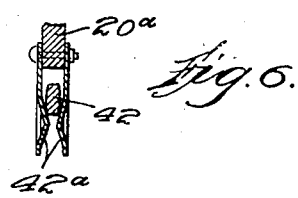
Fig. 6 is a detail section taken as indicated at line 6—6 on Fig. 4.

The driving belt, 12, is confined substantially to a single path by the presence of the up-standing lug or support, 21, at one edge, and a guide rod, 30, adjacent the opposite edge of the belt, and mounted in one of the arms, 20, of the bearing casting. There are shown in the drawings two pulleys, a tight pulley, 31, having a flange, 31ª, and secured by set screw, 31ᵇ, and a loose pulley, 32. As clearly indicated in Fig. 4, the distance between supports, 18 and 19, is greater than the combined width of these two pulleys, by as much as the width of the pulley, 32, and a housing, 33, is formed adjacent the support, 19, and extending back of the vertical plane of the member, 21, which serves as a guide for the belt, 12. The driven shaft itself, indicated at 34, is journaled in the sleeves, 13 and 13ª, slidably mounted in the supports, 18 and 19, respectively, and the two pulleys, 31 and 32, are just fitted between the ends of these sleeves. Therefore, by sliding the sleeves, 13 and 13ª, in said supports, in the direction of the axis of the shaft, 34, the two pulleys may be shifted bodily between these limits, the loose pulley, 32, being moved into or out of the housing, 33, and thus into and out of the path of the belt, 12. With the parts as shown in Fig. 3, the belt, 12, will run upon the loose pulley, 32, without driving the shaft, 34, but by moving the parts to position shown in Fig. 4, the belt being confined between the member, 21, and the guide rod, 30, is prevented from following the loose pulley, 32, into the housing, 33, and therefore remains in its original path for driving the pulley, 31. Such shifting of the belt by longitudinal movement of the pulley is accomplished by providing a nut, 35, fixed on the end of shaft, 34, and retaining thereon a shifter collar, 36, having a pin, 37, engaged by the fork of an arm, 38, of the shifter lever, fulcrumed at 39, in bracket arm, 40, formed integrally with the casting which includes the portions, 18 and 19. Opposite arms, 41 and 42, of said lever are provided with pull cords, 43, so that the operator, by pulling upon one or the other of them can move the lever for longitudinally shifting the sleeves, 13 and 13ª, in the supports, and transferring the drive of the belt from the pulley, 31, to pulley, 32, or vice versa. Preferably a pair of spring gripping arms, 42ª, extend for contact with the arm, 42, which is substantially a flat bar, slightly crowning in cross section as seen in Fig. 6, to retain it yieldingly and frictionally at either limit of its movement. These parts are made of thin sheet metal with middle portions partially detached by slitting and depressed to extend toward each other for engagement with the arm, 42, as indicated in Fig. 6.

A modified form of shifting device is illustrated in Figs. 7 to 10 inclusive, in which the parts which are substantially similar to those above described are indicated by the same reference characters, the belt, 12, being guided as in the above described construction between the guide rods, 30, and a face, 44, of the member, 21. However, in place of the sleeve, 13ª, a sleeve, 45, is provided having a reduced portion, 46, on which the pulley, 32ª is journaled independently of the driven shaft, 34; and the sleeve, 45, is formed with a spiral groove, 47, shown as extending for about 180° and longitudinally by a distance corresponding to the width of face of the pulley, 32ª. A follower, in the form of a roller, 48, on the end of a screw, 49, fixed in the supporting frame, assures that rotation of the sleeve, 45, will be accompanied by a corresponding longitudinal movement sufficient to move the pulley, 32ª, into the housing, 33, provided for it, or out of said housing if the rotation is in the opposite direction. For causing such rotation the outer end of the sleeve, 45, is provided with a shifter arm, 50, and a single pull cord, 51. The shaft, 34, is longitudinally engaged with the sleeve, 45, by the fixed pulley, 31, secured to the shaft, and serving as a shoulder therefor at one end of the sleeve, and by a suitable nut or collar, 35ª, on the outer end of the shaft and overlapping the sleeve. The arm, 50, is formed on an enlarged hub, having a segmental slot, 53, extending for about 180° for traversing a stop pin, 54, secured in the frame casting to limit the amount of rotation of the arm, 50, and sleeve, 45.

However, as the parts are arranged, at either limit of rotation, the arm, 50, extends horizontally, and a direct pull on the cord, 51, would only move it to a depending vertical position; therefore to insure the completion of its half revolution, an oppositely extending arm, 55, carries a counter-weight, 56, whose inertia or momentum will swing it over the middle position to its opposite limit for extending horizontally from the opposite side of sleeve, 45, whenever the rotation of the sleeve has been initiated by a jerk on the pull cord, 51. It is evident that this greatly simplifies the shifting of the belt from the tight to the loose pulley, or returning it to driving engagement with the former.

I claim:

1. The combination of a driven shaft with a tight pulley and a loose pulley thereon, supports in which the shaft is mounted spaced apart by the combined width of said pulleys plus the width of one of them, a belt and guiding means arranged to confine the travel of said belt to the middle portion of the space between said supports, and means for axially shifting the pulleys to bring one or the other of them into said middle portions for engaging the belt.

2. In the combination defined in claim 1, bearing sleeves on the shaft at opposite sides of the pulleys, confining the latter between them and slidably carried in said supports, together with means for moving said sleeves in axial direction for shifting the pulleys.

3. In the combination defined in claim 1, a bearing sleeve on the shaft presenting a shoulder adjacent one side of the loose pulley while the tight pulley stands adjacent the other side of the same, said bearing sleeve being slidable in axial direction in one of the said supports, and means for so moving it to shift the pulleys.

4. In the combination defined in claim 1, the means for axially shifting the pulleys including a bearing sleeve on the shaft formed with a shoulder adjacent one side of the loose pulley and a reduced portion serving to journal said pulley independently of the shaft, the tight pulley on the shaft standing adjacent the other side of said loose pulley, and the sleeve being slidable in one of the supports for shifting the shaft and pulleys.

5. The combination of a driven shaft with a tight pulley and an adjacent loose pulley thereon, bearings for said shaft arranged to permit movement thereof in axial direction, a housing dimensioned to receive one of the pulleys when the shaft is so shifted, together with a driving belt and guiding means by which it is confined to a path adjacent said housing, whereby the axial adjustment of the shaft withdraws one pulley from the belt and transfers said belt to the other pulley.

6. In the combination defined in claim 1, a bearing sleeve for the shaft mounted for longitudinal movement in one of said supports and engaged with the shaft for carrying the latter with it in such movement, a follower fixed on the support and engaging a spiral groove in said sleeve and means for rotating the sleeve.

7. In the combination defined in claim 1, the means for axially shifting the pulleys including a bearing sleeve for the shaft mounted for longitudinal movement in one of said supports and engaged with the shaft for carrying the latter with it in such movement, a follower fixed on the support and engaging a spiral groove in said sleeve, and means for rotating the sleeve together with stop means limiting such rotation.

8. In the combination defined in claim 1, the means for axially shifting the pulleys including a bearing sleeve for the shaft mounted for longitudinal movement in one of said supports and engaged with the shaft for carrying the latter with it in such movement, a follower fixed on the support and engaging a spiral groove in said sleeve, and means for rotating the sleeve, the pitch of said groove being sufficient to shift the sleeve axially by the width of one pulley during less than one revolution, and the means for rotating said sleeve comprising a radially extending arm with a pull cord depending therefrom at one side of the sleeve axis, and a counter weight fixed to the sleeve extending at the other side of said axis adapted to be swung over such axis and to fall to a limit stop when the cord is jerked.

9. In the combination defined in claim 1, a bearing sleeve mounted in one of the supports for rotation and also for longitudinal movement in axial direction in said support, one of said parts having a spiral cam, and the other part having a follower whereby said rotation of the sleeve causes its axial movement, the shaft being journaled in said sleeve and engaged therewith to be carried in axial direction with the sleeve, means for rotating said sleeve at will, and stop means limiting such rotation.

10. In the combination defined in claim 1, a bearing sleeve mounted in one of the supports for rotation and also for longitudinal movement in axial direction in said support, one of said parts having a spiral cam and the other part having a follower whereby such rotation of the sleeve causes its axial movement, the shaft being journaled in said sleeve and engaged therewith to be carried in axial direction thereby, means for rotating said sleeve at will, and a counter weight fixed to the sleeve at a distance from its axis positioned to travel in an arc passing over said axis with stops limiting such travel at each side of the axis in a descending portion of said arc.

In testimony whereof, I have hereunto set my hand at Chicago, Illinois, this 1 day of May, 1919.

HENRY KOCOUREK.